Feb. 20, 1962 B. BOTAR 3,022,089
SAFETY BELT WITH DASHBOARD SUPPORT
Filed Oct. 31, 1960 4 Sheets-Sheet 1

INVENTOR
BELA BOTAR
BY
Blum, Moscovitz, Friedman, & Blum
ATTORNEYS.

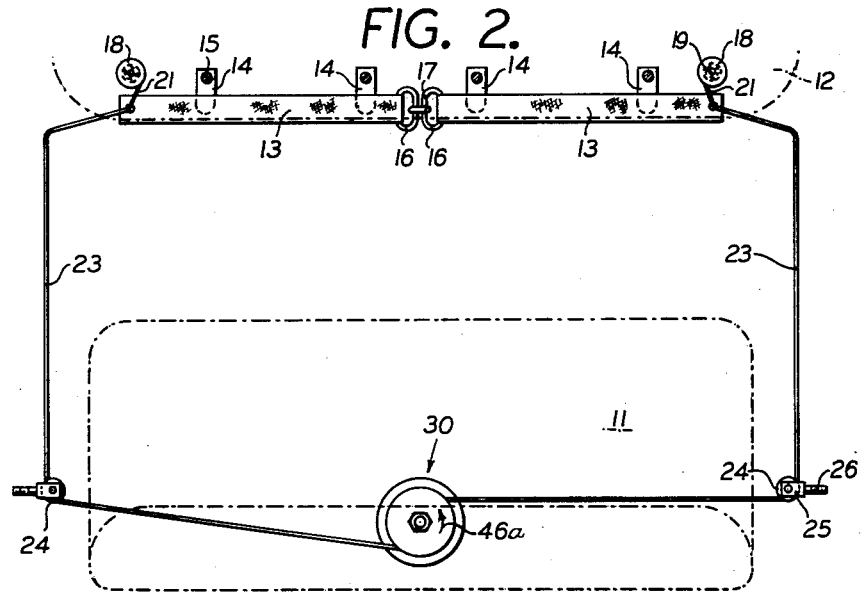
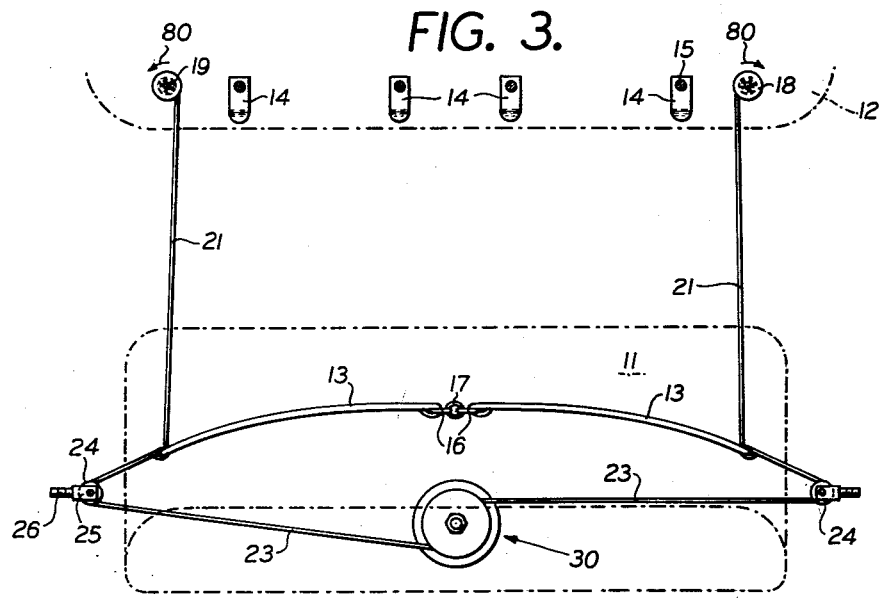

Feb. 20, 1962   B. BOTAR   3,022,089
SAFETY BELT WITH DASHBOARD SUPPORT
Filed Oct. 31, 1960   4 Sheets-Sheet 3

INVENTOR
BELA BOTAR
BY
Blum, Moscovitz, Friedman & Bl
ATTORNEYS.

Feb. 20, 1962    B. BOTAR    3,022,089
SAFETY BELT WITH DASHBOARD SUPPORT
Filed Oct. 31, 1960    4 Sheets-Sheet 4

INVENTOR
BELA BOTAR
BY
Blum, Moscovitz, Friedman & Blum
ATTORNEYS.

United States Patent Office 3,022,089
Patented Feb. 20, 1962

3,022,089
SAFETY BELT WITH DASHBOARD SUPPORT
Bela Botar, 3901 W. 7th St., Los Angeles, Calif.
Filed Oct. 31, 1960, Ser. No. 66,300
8 Claims. (Cl. 280—150)

This invention relates generally to safety appliances for vehicles, and is especially concerned with a safety belt construction for restraining the body of a person in a vehicle.

This invention is a continuation-in-part of my previous U.S. application Serial Number 756,143, for Safety Belt, filed August 20, 1958, now abandoned.

In recent years, there has been a considerably increased use of safety or seat belts in automobiles and the like. However, such seat belts have presented certain disadvantages. It is necessary that each person entering the car physically fasten the seat belt in place, in order to obtain the benefit of the restraining force of the seat belt. In many instances, people are reluctant to or forget to fasten the seat belt. Furthermore, once fastened, it has been necessary to have the seat belt always around the body of the wearer, and thereby restricting his movements. However, it is well known that the seat belt seldom has to be used, the primary occasion for the use of the seat belt arising in the case of a sudden stop.

One important object of this invention is to provide an improved seat belt construction, such that the passenger or driver in the vehicle does not have to perform any physical act in order to have the seat belt ready for use.

Another object of the invention is to provide a seat belt which is not fastened in a restraining manner around the body of the driver or passenger, and which in fact is ordinarily substantially concealed from view, but which will be instantly tightened around the body of the wearer in the event of a sudden stop or other emergency.

In accordance with one embodiment of the invention, the safety belt is ordinarily located releasably in a position underneath the dashboard of the automobile. Cables extend loosely from each end of the seat belt, on the floor of the car, to an operating mechanism behind or under the seat. The cable can be arranged, with sufficient slack, so that they are substantially concealed from view and so that they are not in the way of the passengers or driver. In other words, in ordinary use, the passenger or driver can enter the car, leave the car, or sit in the car without in any way realizing or noticing the presence of the safety belt. In the event of a sudden stop, any appropriate switch or other suitable actuating device may be employed which actuates an electric control mechanism for the cable, whereby rapidly to draw up slack in the cable. The effect of drawing up the tension in the cable, at a rapid rate, is to pull the seat belt loose from the dashboard and to draw it directly into the laps of the driver and passengers in the front seat of the car. It will be understood that a similar device can be installed for use in the back seat, with the seat belt then being located against the back of the front seat.

As a further feature of the invention, operator controlled means are provided for releasing the tension on the cable, so as to permit letting out the cable, for comfort of the passengers during driving. It will also be understood that when the seat belt is no longer needed, it may be placed against the dashboard again, and the cables placed in their normal inactive position.

Optionally, tensioning means may be provided for automatically restoring the seat belt to its position against the dashboard when the tension on the cable is released.

As another feature of the invention, the force to draw in the cable is provided by means of an electric motor, thereby eliminating the need for springs to tighten the seat belt against the wearers.

Other objects and advantages of the invention will become apparent from the following description in conjunction with the annexed drawings, in which preferred embodiments of the invention are disclosed.

In the drawings:

FIG. 2 is a top plan view of the assembly, showing the safety or seat belt in normal or extended position, with the cable let out or slack, the belt being mounted on a dashboard which is shown in broken lines. The front seat of the vehicle is also shown in broken lines.

FIG. 3 is a view similar to FIG. 2, showing the safety belt in retracted or tensioning position, with the cable drawn in or taut.

Figure 1:
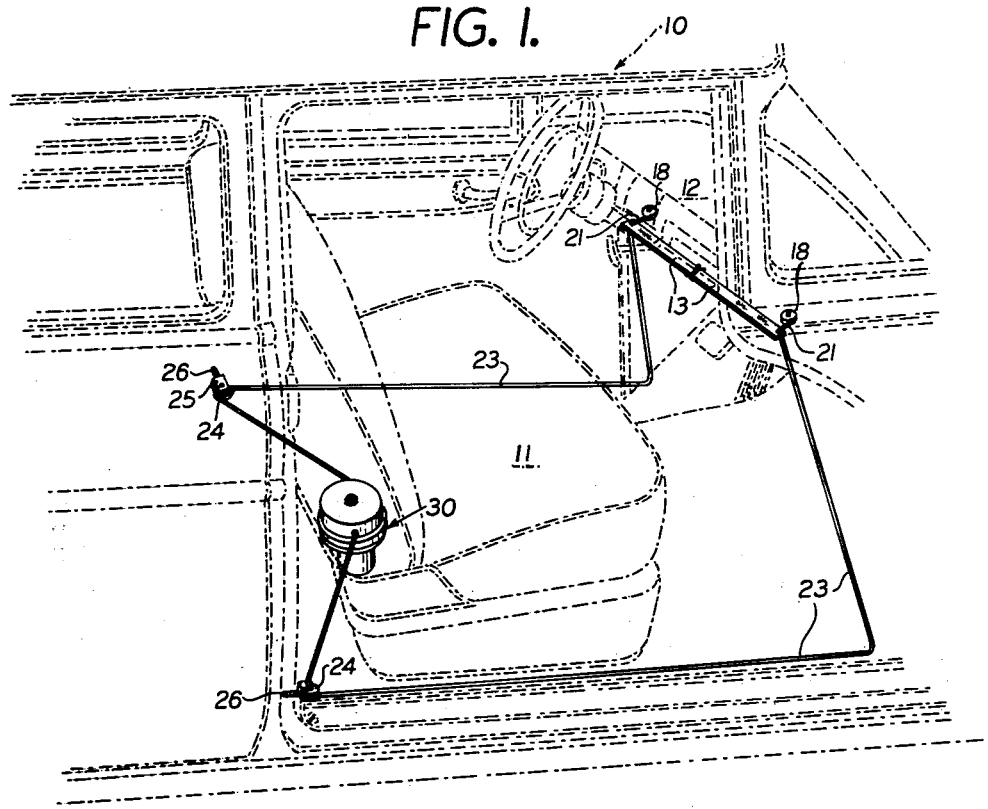
FIG. 1 is a perspective view of my improved safety or seat belt assembly, showing it installed in an automobile. The vehicle is shown in broken lines, so as to permit the operating parts of the seat belt assembly to be seen.
Figure 8:
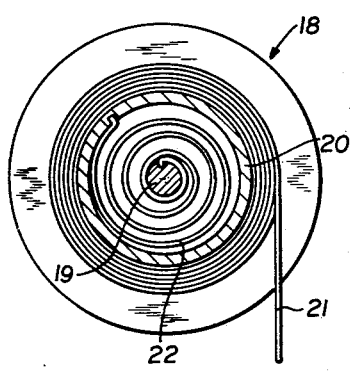
FIG. 8 is a detailed sectional view of a mechanism for releasably holding the seat belt against the dashboard.
Figure 9:
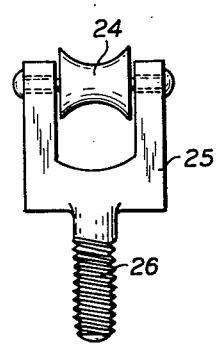
FIG. 9 is an elevational view of a form of pulley, useful in accordance with the invention, for confining the movements of the cable to the appropriate path.

By reference to the drawings in detail, it will be noted that they show, somewhat diagrammatically, an automobile 10 to which the safety belt system is illustratively applied. This automobile 10 has a front seat 11 and a dashboard 12, these being arranged in a manner which is well known and which does not require extended description.

Optionally, but without limitation thereto, the safety belt itself comprises two sections 13 in lateral alignment. Each of these sections 13 is secured under the dashboard by means of clips 14, two such clips 14 being illustratively shown for each seat belt section 13. Each said clip 14 is secured by a stud 15 to the underside of dashboard 12, and may be of any suitable resilient construction so as to hold the seat belt releasably against the bottom of the dashboard. The two seat belt sections 13 terminate at their inner ends in rings 16 which are releasably secured together by buckle 17. It will be apparent that in cases in which it is only desired to provide one seat belt for the entire front seat, then a single belt section, instead of the two sections 13, may be employed.

Optionally, the seat belt sections 13 may be biased into position against the dashboard 12 by means of spring loaded reels 18. Optionally, there is one such reel 18 for each seat belt section 13, these reels 18 being located adjacent the outer end of the safety belt sections 13. Each said reel 18 is turnable on a vertical stud 19 which is fixed to the underside of the dashboard 12, or another suitable location, by any suitable means. Each said reel 18 includes a pulley 20 on the periphery of which cable 21 is wound. An internal spiral spring 22 on the stud or shaft 19 and coupled to the pulley 20, in the usual manner, tends to maintain the cable 21 in wound up condition on the reel 18. The free end of each cable 21 is connected by any suitable means to an appropriate seat belt section 13.

It will be apparent that either the spring clips 14 or the reels 18, or both, may be employed. Thus, the reels 18 are themselves sufficient to draw the seat belt sections 13 into general position against the underside of dashboard 12. However, for greater neatness, it is then possible to insert the seat belt sections 13 into the clips 14. On the other hand, if the reels 18 are omitted, it is still possible to use the clips 14 to hold the seat belt sections 13 in place.

A cable 23 is fixed to the outer end of each belt section 13. As will be explained below, this cable 23 is normally slack. The cable 23 is led rearwardly from dashboard 12, preferably on the floor, and along a respective side of seat 11, to a respective pulley 24. Each said pulley 24 is turnably mounted on a bracket 25 having a screw shank 26 which may be threaded laterally and outwardly into the frame of the automobile. Any other suitable means for anchoring pulley 24 may be employed, it being important that this pulley be properly anchored since it bears the stress of movement of the body against the seat belt in case of a sudden stop.

Figure 6:
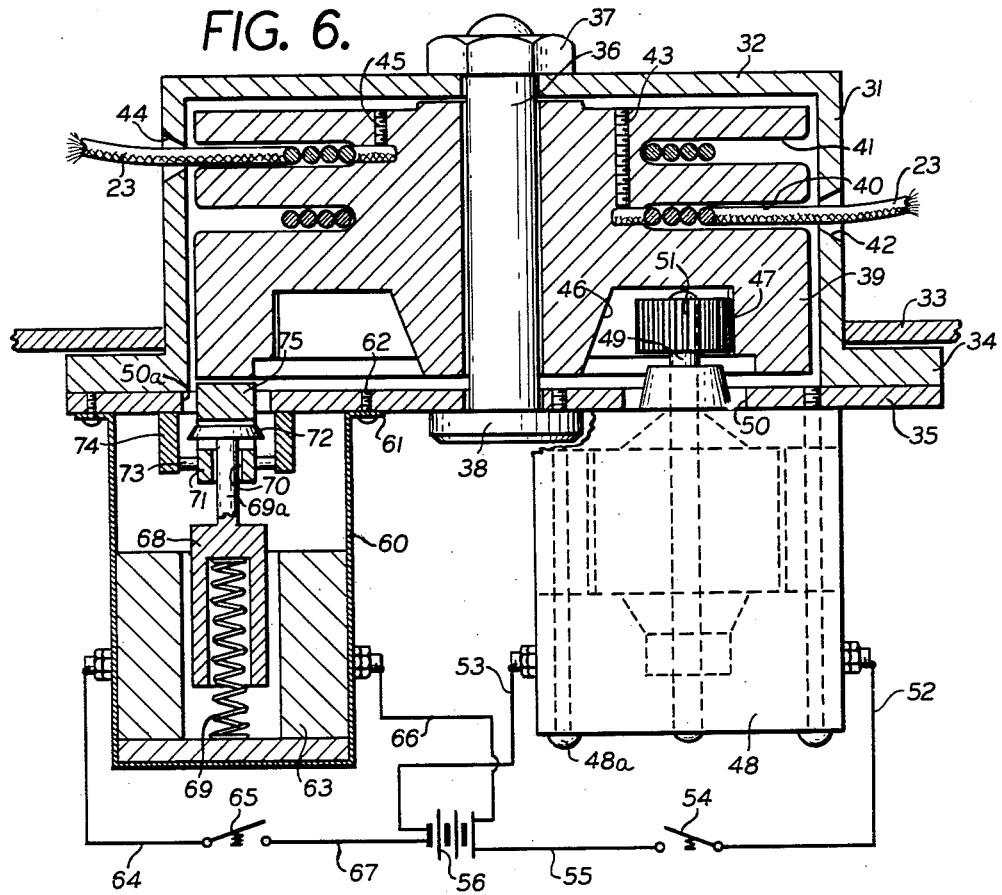
FIG. 6 is a longitudinal section of a motor and control solenoid in accordance with the invention.
Figure 7:
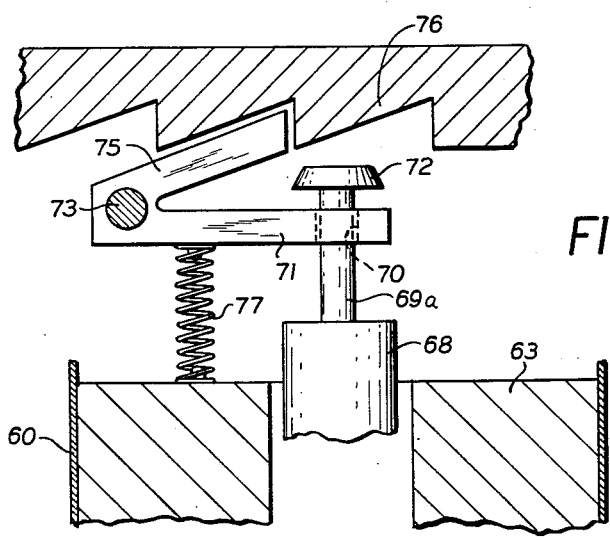
FIG. 7 is a fragmentary longitudinal section of the solenoid and control apparatus shown generally in FIG. 6.

The two cables 23 are extended laterally inwardly of the respective pulleys 24 and into the motor and control mechanism shown in detail in FIGS. 6 and 7, and designated generally by the reference numeral 30. This mechanism 30 is preferably fixed to the floorboard 33 of the automobile below seat 11. Since the major operating stress is placed upon the two pulleys 24, which are secured to the automobile frame, it is sufficient to secure the control mechanism 30 to the thin floorboard, and it does not have to be anchored as securely as in some prior art constructions.

The control mechanism 30 includes a generally cylindrical casing 31, whose axis extends vertically, and which may be extended through an opening in the floorboard 33 below seat 11. This casing 31 has a top end wall 32 and has at its bottom an outwardly extending peripheral flange 34. Flange 34 may be secured to the lower face of floorboards 33 by any suitable means, such as bolts (not shown). Cover 35 is fixed to the lower face of flange 34 by any suitable means (not shown). An axially extending shaft 36 extends through the interior of casing 31 and through an opening in top end wall 32 and through a central opening in cover 35. The ends of shaft 36 are secured in place by means of lower head 38 and top nut 37. Drum 39 is turnably mounted on shaft 36.

Drum 39 has a pair of axially spaced, annular grooves 40 and 41 in the periphery thereof. Groove 40 registers with an aperture 42 in the side wall of casing 31, through which one of the cables 23 is extended. The inner end of cable 23 is anchored in groove 40, adjacent the inner edge thereof, by means of an axially extending set screw 43 which extends to the upper end of drum 39 and which is screwed into a corresponding threaded bore thereof, with the lower end of the screw frictionally abutting the inner end of the cable 23.

Similarly, the casing 31 has another aperture 44, opposed to aperture 42, and registering with groove 41. The other cable 23 is extended through aperture 44 into the groove 41 and is similarly anchored by means of set screw 45. It will be apparent that upon rotation of drum 39 in the direction of arrow 46a (FIG. 2), the two cables 23 will be wound up on the periphery of drum 39, in the respective grooves 40 and 41, as shown in FIG. 6.

At its lower end, drum 39 has an annular recess 46, and an internal gear 47 on the outer periphery of recess 46.

An electric motor 48 is fixedly mounted on the lower face of cover plate 35 by means of bolts 48a, and has an output shaft 49 which extends vertically. This shaft 49 extends through an aperture 50 in cover 35 and into recess 46. Gear 51 on shaft 49 meshes with gear 47 so as to drive drum 39 when the electric motor 48 is energized. Motor 48 may be any suitable motor, and is accordingly not shown in detail. Said motor has a pair of input terminals to which electric lines 52 and 53 are respectively connected. Said line 52 leads to one terminal of a control device which is illustratively indicated as a switch, designated by the reference numeral 54, this switch 54 being normally open. As will be explained below, the invention is not limited to the use of a switch 54, and other control means may be provided. The other terminal of switch 54 is connected by electric line 55 to one terminal of battery 56, and line 53 is connected to the other side of battery 56. It will be apparent that any suitable power source may be substituted for battery 56.

Any other suitable electric connections for the motor may also be employed.

Diametrically opposite motor 48, a further cylindrical casing 60 is fixed to the underside of plate 35. This cylindrical casing 60 has a top end annular peripheral flange 61 which is connected by screws 62 to plate 35.

An electric solenoid 63 having a vertical axis is mounted within casing 61. This solenoid 63 has a pair of input terminals, one of which is connected by line 64 to one terminal of switch 65, and the other of which is connected by line 66 to one terminal of battery 56. Line 67 connects the other terminal of battery 56 to the other terminal of switch 65. Switch 65 is normally open and may be a manual switch located in any convenient place in the automobile. For example, switch 65 may be located on the dashboard. Optionally, any other suitable control device may be substituted for switch 65.

Solenoid 63 has a plunger 68 which is upwardly biased by means of spring 69, in the usual way. Said plunger 68 connects at its upper end with a vertical rod 69a which extends through an end slot 70 of a horizontal arm 71. Rod 69a has a head 72 above the arm 71.

The outer end of arm 71 is supported turnably upon a horizontal shaft 73, the ends of this shaft 73 being supported by a bracket 74 which is fixed to the underside of plate 35. Above shaft 73, arm 71 connects with an upwardly inclined and opposing pawl 75 which extends through an opening 50a of plate 35.

The underside of drum 39 is provided, adjacent its outer periphery, with a circumferentially extending set of ratchet teeth 76. Said pawl 75 and ratchet teeth 76 are cooperatively shaped, so that in the upward position of pawl 75, it engages against the teeth 76 in such a way as to prevent movement of drum 39 in the direction opposite to that of arrow 46 (FIG. 2). However, when the drum 39 is turned by electric motor 48 in the direction of arrow 46, the teeth 76 ride over pawl 75.

A spring 77 between the upper end of the casing of solenoid 63 and the lower face of arm 71 serves to urge pawl 75 upwardly, or in a counterclockwise direction with respect to the axis of shaft 73, as taken in FIG. 7. When solenoid 63 is energized, by the closing of switch 65, plunger 68 is lowered against the action of spring 69, thereby rocking pawl 75 about the axis of the shaft 73, out of engagement with teeth 76 and thereby permitting unwinding of the cables 23 from drum 39.

The operation of the invention is as follows:

Normally, both switches 54 and 65 are open. Initially it is assumed that sufficient slack has been provided in cables 23 to permit the belts 13 to be secured by clips 14 under dashboard 12. Each cable 23 is draped on the floor, being optionally loosely covered by the floor rug or floor pad. The cable 23 is virtually concealed from view and passes under pulley 24 in the manner described above. The operator and the passengers can enter and leave the automobile, by its doors, and sit on seat 11 without being at all aware of the presence of the safety belt system.

In the event of a sudden deceleration, switch 54 may be closed or other control device actuated, so as to energize motor 48. Thus, switch 54 may be coupled to the brakes of the vehicle so as to be actuated when a brake pressure reaches a desired level, or a mercury switch may be employed or any other suitable control mechanism may be used. In any event, when the motor 48 is energized, drum 39 is turned in the direction of arrow 46 so as to reel in the two cables 23. The initial action of the cables 23 is to draw up slack so that each cable 23 extends in a straight line from pulley 24 to the point of attachment of the cable to the end of the belt section 13. Accordingly, since the pulleys 24 are located adjacent the floor and the belt 13 is initially located under the dashboard 12 which is elevated, the cables 23 extend downwardly rearwardly from belt section 13 to pulleys 24. Upon further movement of the drum 39, the now tightened cables 23 remove the belts 13 from the clips 14, against the action of the spring reels 18, and move the belts 13 into position against the passengers and driver, so as to hold them firmly in seat 11. Any outward movement of the belt is prevented, because of the location of pawl 75 against ratchet teeth 76 of drum 39.

When the emergency is over, switch 54 is automatically opened, thereby de-energizing electric motor 48. Switch 65 may then be manually closed, thereby energizing solenoid 63 and causing pawl 75 to be moved out of engagement with ratchet teeth 76. The seat belt is now slack, and not under tension by the electric motor, and the two spring reels 18 automatically draw seat belt sections 13 back toward their original position under the dashboard. In the event that the reels 18 are omitted, then the operator manually grasps the belt sections 13 and restores them to their original position under the dashboard and held in place by the clips 14. Further slack is then drawn up on the cables 23 so that they may be located as initially, on the floor and adjacent the doors of the vehicle, or in other unobtrusive position. The manual switch 65 may then be released. FIG. 2 shows the normal position of the parts. FIG. 3 shows the seat belt under tension, and shows by means of arrow 80, the direction of rotation of reels 18, in order to return the belt sections 13 toward their original position.

Figure 4:
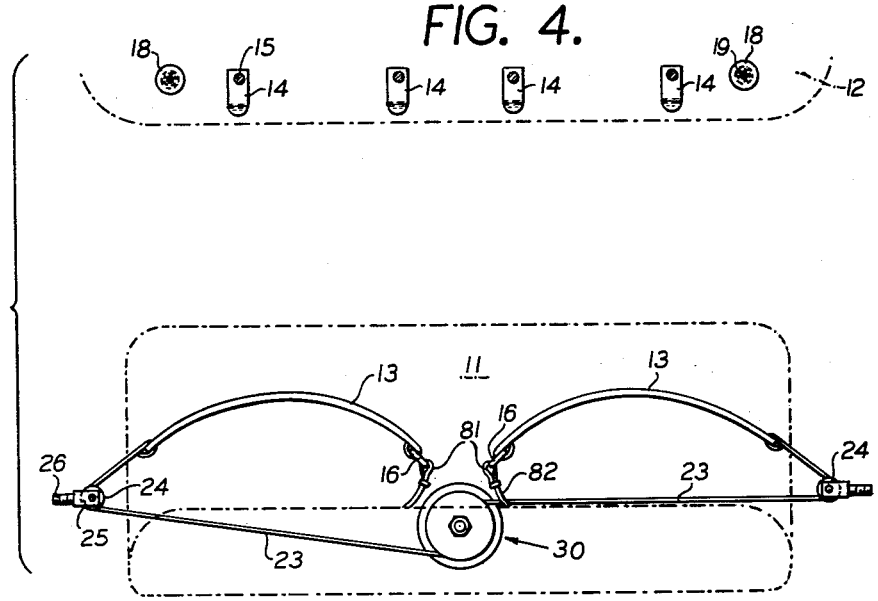
FIG. 4 is a top plan view, similar to FIG. 3, showing an application of the invention in which the two halves of the safety belt are separated from each other and are individually secured in position around separate passengers on the front seat of the vehicle.

As shown in FIG. 4, it is possible to use the two seat selt sections 13 independently, by detaching the clasp 17. Each belt section 13 may then be secured by any suitable clasp 81 to a belt section 82 which may be fixed to the vehicle at the center of the seat.

The embodiment of FIG. 4 gives the advantage of individual seat belt sections 13, but does require the user manually to fasten one end of each seat belt in place. It should be clear, in connection with the embodiment of FIG. 4, that by connecting the two belt sections 13, by means of clasp 17, the embodiment may be operated exactly the same as in the case of the first embodiment. In other words, the two belt sections 82 are optional and may be added to the construction of the first embodiment.

Figure 5:
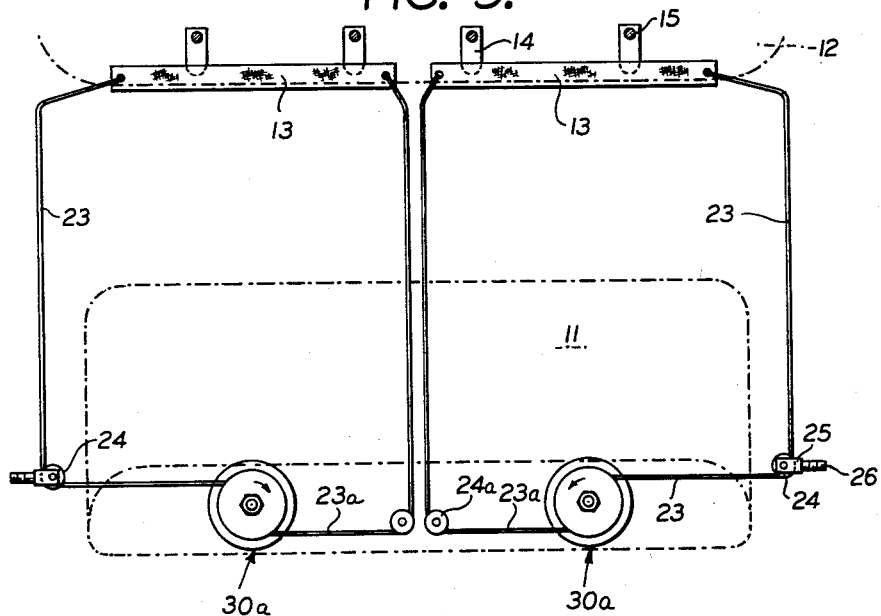
FIG. 5 is a top plan view of a modification of the invention in which two separate safety belts are employed, one for each passenger on the front seat, each being controlled by a separate motor.

FIG. 5 shows a further modification, in which there are two control units 30a, one for each side of the seat, and each to control a separate belt section 13. Each of the units 30a is connected by an outer cable 23, via pulley 24, to the outer end of a seat belt section 13, exactly as in the embodiment of FIG. 1. In addition, a further cable 23a is coupled to the inner end of each unit 30a, the principle being clear from a consideration of the drawings in connection with the first embodiment. Each said cable 23 extends inwardly from unit 30a and around a further pulley 24a which is anchored similarly to pulley 24, and from there extends to the inner end of a respective seat belt section 13. It will be apparent that if the motor of either control unit 30a is energized, the corresponding seat belt section 13 will be independently retracted into position against the passenger or driver, as the case may be. The embodiment of FIG. 5 requires the use of two control units, but it has the advantage that the individual seat belt unit 13 will fit more conformingly around the wearer and will furnish greater support in the event of an accident, than as in the case with the composite seat belt sections 13 of the first embodiment.

Tests of an actual working embodiment of the invention have shown that the assembly is extremely rugged, is economical to manufacture, and operates efficiently and rapidly to bring the belt into retracted or confining position, while at the same time the system is unobtrusive and almost invisible during conditions of normal use. In addition, because of the use of anchoring pulleys 24, relieving the strain upon the motor assembly, it is extremely easy to install the assembly.

In each of the various embodiments, a safety belt assembly is disclosed for use in conjunction with a longitudinally extending automobile having a laterally extending seat and a base support 33 for said seat, as well as a frame member above and in front of the seat. This frame member may be the dashboard, in case the safety belt assembly is to be applied to the front seat, and may be the back of the front seat, in case the safety belt assembly is to be applied to the rear seat.

The assembly includes the belt sections 13, which may also conveniently be designated as a strap or strap sections. In each embodiment, the strap is supported in laterally extending position on the frame member (such as the dashboard) above and in front of the seat. In each embodiment, the pulleys are mounted on the support behind the seat and in approximately longitudinal alignment with the ends of the strap. In each embodiment, there are a pair of reels adapted to be mounted on the support between the pulleys, with the cables wound on the reels and extending over the pulleys and connected to the respective ends of the strap.

In each embodiment, there are operator-controlled motor means coupled to the reels for winding in the cables on the reels at the will of the operator, so as to release the strap from the frame member and draw the strap downwardly rearwardly taught against the lap of the occupant or occupants of the seat. Finally, in each embodiment, there are operator-controlled ratchet means coupled to the reels for preventing the unwinding of the cables when the ratchet means are active, while permitting unwinding of the cables and restoration of the strap to its position on the frame when the ratchet means are made inactive.

Also for convenience in interpreting the claims, it is understood that the pulleys may be connected either directly to the floorboard or to a frame member located adjacent to the floorboard. In the claims, the term "support" as applied to the member receiving the pulleys is understood to mean the floorboard or any other convenient adjacent support means.

While I have disclosed a preferred embodiment of the invention, and have indicated various changes, omissions and additions which may be made therein, it will be apparent that various other changes, omissions and additions may be made in the invention without departing from the scope and spirit thereof.

What is claimed is:

1. Safety belt assembly for a longitudinally extending automobile having a laterally extending seat, a base support for said seat, and a frame member in front of and above said seat; said assembly comprising a strap, means for releasably supporting said strap in laterally extending position on said frame member above and in front of said seat, pulleys adapted to be mounted on said support behind said seat and in approximate longitudinal alignment with the ends of said strap, a pair of reels adapted to be mounted on said support between said pulleys, cables respectively wound on said reels and extending over said pulleys and connected to the respective ends of said strap, operator controlled motor means coupled to said reels for winding in said cables on said reels at the will of the operator, said strap being thereby released from said frame member and drawn downwardly rearwardly taut against the lap of the occupant of the seat, and operator-controlled ratchet means coupled to said reels for preventing unwinding of said cables when said ratchet means are active, said ratchet means being adapted to be made inactive to permit unwinding of said cables and restoration of said strap to its position on said frame.

2. Safety belt assembly according to claim 1, said strap being in two sections which are laterally aligned, said assembly also comprising means for releasably connecting the inner ends of said strap sections.

3. Safety belt assembly according to claim 1, said strap being in two sections, said assembly also comprising a pair of further straps adapted to be mounted on said support centrally relative to said seat, and means for connecting the inner end of each said first mentioned strap section to each said further strap so as to provide individual seat belt action for each of two occupants of said seat.

4. Safety belt assembly according to claim 3, said assembly also comprising means for connecting said first mentioned strap sections together alternatively to connecting said first mentioned strap sections to said second mentioned straps, said motor means acting upon said reels in unison, said ratchet means also acting upon said reels in unison.

5. Safety belt assembly in accordance with claim 1, there being two such assemblies in duplicate, one for each side of the seat.

6. Safety belt assembly for a longitudinally extending automobile having a laterally extending seat, a base support for said seat, and a frame member in front of and above said seat; said assembly comprising a strap, means for releasably supporting said strap in laterally extending position on said frame member above and in front of said seat, pulleys adapted to be mounted on said support behind said seat and in approximate longitudinal alignment with the ends of said strap, a shaft vertically mounted on said support between said pulleys, a pair of unitary reels turnably mounted on said shaft, cables respectively wound on said reels in senses so as to be wound and unwound thereon in unison, said cables extending over said pulleys and connected to the respective ends of said strap, an operator-controlled electric motor, means coupling said motor to said reels for winding in said cables on said reels upon energization of said motor by said operator, said strap being thereby released from said frame member and drawn downwardly rearwardly taut against the lap of the occupant of the seat, a ratchet coupled to said reels, a pawl movable into and out of engagement with said ratchet means and adapted when engaged with said ratchet means to prevent unwinding of said cables and adapted when out of engagement with said ratchet means to permit unwinding of said cables and restoration of said strap to its position on said frame, spring means normally maintaining said pawl in engagement with said ratchet means, and operator-controlled means coupled to said pawl for moving said pawl to its position out of engagement with said ratchet means.

7. Safety belt assembly in accordance with claim 6, said means for moving said pawl to its inactive position comprising a solenoid having a solenoid plunger, and means coupling said pawl to said plunger.

8. Safety belt assembly according to claim 7, said assembly also comprising auxiliary reel means mounted on said frame member and connecting with said strap and spring biased so as normally to tend to draw said strap against said frame member.

References Cited in the file of this patent
UNITED STATES PATENTS

| | | |
|---|---|---|
| 2,858,144 | Oppenheim | Oct. 28, 1958 |
| 2,883,123 | Finnigan | Apr. 21, 1959 |